United States Patent [19]
Dumoulin

[11] 3,865,773
[45] Feb. 11, 1975

[54] AQUEOUS DISPERSION OF (1) ORGANOPOLYSILOXANE AND (2) ALLYL ALCOHOL—ACRYLAMIDE COPOLYMER AS PAPER COATING

[75] Inventor: Jean Dumoulin, Villerubanne, France

[73] Assignee: Rhone-Poulenc S.A., Paris, France

[22] Filed: July 6, 1973

[21] Appl. No.: 377,040

[30] Foreign Application Priority Data
July 5, 1972 France .............................. 72.24701

[52] U.S. Cl. ................ 260/29.6 NR, 117/155 VA, 260/29.6 H
[51] Int. Cl. ............................................ C08f 45/24

[58] Field of Search ... 260/29.6 NR, 29.6 H, 29.6 B

[56] References Cited
UNITED STATES PATENTS
3,556,754  1/1971  Marsden et al. ............ 260/29.6 NR
3,624,020  11/1971  Klebert et al. ............. 260/29.6 NR Primary Examiner—Harold D. Anderson
Attorney, Agent, or Firm—Stevens, Davis, Miller & Mosher

[57] ABSTRACT

An aqueous dispersion useful for imparting non-stick properties to paper comprises an organopolysiloxane and a copolymer of allyl alcohol (5 to 40 mol percent) and acrylamide (60 to 95 mol percent).

4 Claims, No Drawings

AQUEOUS DISPERSION OF (1) ORGANOPOLYSILOXANE AND (2) ALLYL ALCOHOL—ACRYLAMIDE COPOLYMER AS PAPER COATING

The present invention relates to a coating composition which can be used for rendering the surface of paper non-stick.

By non-stick, there is meant the ability of a material to be detached easily from adhesive or sticky materials with which it is brought into contact.

Very many areas exist where it is necessary to make use of non-stick materials, for example packings for bitumen, unvulcanised rubber, waxes or resins and hot-melts, backings for self-stick-on labels, adhesive tapes (free from adhesive on the face), transfer papers for vinyl plastisols or for the manufacture of imitation leather made of polyurethane and the like. Various coating compositions have already been proposed which make it possible to impart non-stick properties to the materials used, for example, compositions based on starch, polyvinyl alcohol and carboxymethylcellulose. Organosilicon polymers are also suitable material for such treatment and have been widely proposed, see, for example, U.S. Pat. Nos. 2,588,367; 2,985,544; 2,985,545; 2,985,546 and 2,869,722 and French Pat. Specification No. 1,326,930. These patent specifications describe either compositions containing only organosilicon polymers or compositions in which these polymers are combined with other substances such as film-forming organic polymers, for example, cellulosic derivatives, polyvinyl resins and polyacrylic resins. The presence of the organic polymer makes it possible to combine non-stick properties with other properties such as the ability of the treated material to be welded to itself. Moreover, the presence of the film-forming organic polymer makes it possible to limit penetration of the organosilicon polymer into the interior of the paper, that is to say the amount of polymer necessary to obtain the desired non-stick quality.

The coating compositions of the present invention contain an organosilicon polymer and film-forming organic polymer. These compositions, which are intended more particularly for the treatment of the paper used as transfer paper for vinyl plastisols or polyurethanes, possess numerous advantages and properties, including their preparation at ambient temperature, their non-stick quality and the surface finish they impart to the treated papers.

The compositions according to the invention are aqueous dispersions comprising an organopolysiloxane and a water soluble copolymer of 5 to 40 mol percent allyl alcohol and 60 to 95 mol percent acrylamide.

The molar percentage of each of the constituents of the copolymer is preferably 10 to 30 percent allyl alcohol and 70 to 90 percent acrylamide.

The specific viscosity of these copolymers, measured at 25°C using aqueous solutions of concentration 5 g/l, is generally 0.1 to 2.

In a preferred embodiment, these aqueous dispersions comprise, per 100 parts by weight of water: 1 to 5 parts by weight of the allyl alcohol/acrylamide copolymer and 2 to 10 parts by weight of the organopolysiloxane.

The allyl alcohol/acrylamide copolymer can be prepared by the usual techniques for the polymerisation of compounds containing ethylenic double bonds. The reaction is generally carried out in the presence of a free radical initiator, for example, per-salts, organic peroxides, redox systems of azobisisobutyronitrile. The reaction can also be initiated by irradiation, for example, by ultra-violet radiation.

The polymerisation can be carried out in a medium which is simultaneously a solvent for the monomers and for the polymer. Examples of such solvents include water, dimethylformamide and dimethylsulphoxide.

The polymerisation can also be carried out in a medium which is a solvent for the monomers but which is a non-solvent for the polymer and examples of this type of liquid include alcohols such as methanol and hydrocarbons such as benzene.

The organopolysiloxane component in the compositions according to the invention preferably comprises:
a. 60 to 98 percent by weight of an organopolysiloxane of the formula

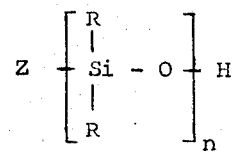

in which the symbols R, independently represent an alkyl radical with 1 to 4 carbon atoms or a phenyl radical, Z represents a hydroxyl group or an R group an $n$ is an integer of 10 to 100,000.

b. 2 to 40 percent by weight of an organopolysiloxane, which is:
i. an organohydrogenopolysiloxane of the formula

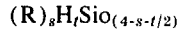

in which R has the meaning give above, and the average value of $s$ is 1 – 1.5, that of $t$ is 0.75 – 1.25 and that of the sum $s+t$ is 2-2.25, or ii. an organopolysiloxane resin comprising repeating units of the formulae

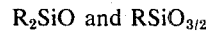

in which the symbols R have the meaning given above, the respective proportions of the said units being such that the number of -R groups bonded to a silicon atom is 1.05 – and 1.4, or iii. a polyalkyl silicate, and c. a curing agent catalyst, in an amount of 0.05 to 10 percent of the weight of the polysiloxane (a).

The viscosity of the polysiloxane (a) is generally 10 – 2,000,000 cPo at 25°C. These polymers can be obtained from chlorosilanes or cyclic polymers of low molecular weight in accordance with techniques which are now well known.

The hydrogenopolysiloxane b(i), which can be linear or cyclic, can be obtained in accordance with the techniques described, for example, in U.S. Pat. Nos. 2,491,843; 2,595,890 or 2,595,891.

The organopolysiloxane resin b(ii) generally contains 5 to 40 percent ( by number) of diorganosiloxy units. These resins can be prepared by cohydrolysis of diorganodichlorosilane (5–40 mol percent) and diorganotrichlorosilane (60–95 mol percent). The preparation of such resins is described in U.S. Pat. No. 2,258,218.

The polyalkyl silicate $b$(iii) can be obtained by partial hydrolysis of an organic silicate of the formula $(R_1O)_4$ Si in which the symbol $R_1$ represents an alkyl radical containing 1 to 5 carbon atoms.

Preferentially, the proportion of organopolysiloxane (a) in the mixture of organosilicon compounds (a+b) represents 80 to 95 percent by weight.

The curing agent or catalyst for the organosilicon compounds is preferably a tin salt, such as dibutyl-tin dilaurate or dibutyl-tin diacetate. Other metal derivatives can, however, be used, such as, for example, derivatives of iron, zinc, zirconium, lead or cobalt.

The compositions according to the invention are in the form of aqueous dispersions containing the various ingredients described above.

These compositions can be prepared by direct dispersion of the organic copolymer, the organopolysiloxane and the catalyst, in water which is stirred. It is however possible and even advantageous to prepare dispersions or solutions of the various constituents (aqueous solution of the allyl alcohol/acrylamide copolymer, aqueous dispersion of the mixture of organopolysiloxane and aqueous dispersion of the catalyst) and then to mix these dispersions or solutions.

It is to be understood that the compositions according to the invention have been described above in their essential constituents. These compositions can of course also contain adjuvants such as dispersion agents, thickeners and fillers.

The viscosity of the compositions according to the invention is usually 5 - 100 cPo at 25°C and preferably 20 - 40 cPo.

These compositions can be applied to the material to be treated — usually paper — in accordance with any of the various coating techniques which are used at the present time. It is thus possible to carry out a knife coating, according to the Champion system, according to the so-called "gravure" system (West Virginia type) or according to the so-called "Reverse Roll" system. In the invention, it is preferred to use the so-called "layer of air" system: according to this system, an application roller made of rubber or stainless steel deposits on the paper an amount of coating product greater than the desired amount, the excess product being removed by a jet of air which, at the same time, evens out and smoothes the layer deposited. Of course, both faces of the paper or only one face can be coated.

The amount of dry product deposited on the paper is generally between 0.1 and 5 g/m².

Application of the non-stick compositions is usually followed by drying at a temperature which can be between 100° and 200°C. The duration of this drying, which depends on the effectiveness of the ventilation in the drying chamber, generally varies between 1 second and 5 minutes.

The compositions according to the invention impart non-stick properties to the treated paper and enable them to be used in the most varied fields, and particularly, those mentioned above. It is to be understood, however, that the specific applications mentioned are given purely by way of example.

The applications in which the compositions acccording to the invention lead to particularly advantageous results are the various forms of transfer-paper, that is to say papers acting as supports for casting and polymerisation or curing of polymers such as vinyl polymers (plastisols) or polyurethanes (manufacture of imitation leather). In these applications, the compositions according to the invention provide a combination of noteworthy properties, including the evenness of the non-stick layer, the great effectiveness of the non-stick character and the surface finish of the treated papers which determines the surface finish of the film of plastisol or polyurethane.

The following Example, which is given without implying any limitations, illustrates the invention and shows how it can be put into practice.

EXAMPLE

A coating composition (C) is prepared from: 80 g of an aqueous solution containing 5 percent of an allyl alcohol/acrylamide copolymer prepared as indicated below, 10 g of an aqueous dispersion containing 40 percent of organopolysiloxanes defined below, 0.4 g of an aqueous dispersion containing 20% of dibutyl-tin dilaurate and 9.6 g of water.

This composition, the viscosity of which is 30 cPo at 25°C, is used to coat, by means of an "air knife" device, a kraft paper (soda pulp, based on resinated, bleached, calendered paper) weighing 150 g per m².

The amount of composition (C) deposited on the paper is 15 g/m². The coated paper is then dried in a tunnel furnace temperature: 150°C, residence time: 20 seconds).

The allyl alcohol/acrylamide copolymer used to prepare the composition (C) is prepared in the following way:

3 l of deoxygenated water, 1,065 g (15 mols) of acrylamide and 870 g (15 mols) of allyl alcohol are introduced into a 6 litre flask which has previously been purged with nitrogen. The temperature is raised to 60°C and then 5 g of potassium persulphate are introduced and the temperature is kept at 60°C. 5 g of potassium persulphate are added 25 minutes after the 1st introduction of initiator followed by 10 g of the same initiator 20 minutes after the second addition. The whole mass is stirred for 17 hours at 60°C and then cooled, the mass obtained is concentrated to half its volume (pressure reduced to 100 mm Hg - temperature 50°C) and then the concentrate is precipitated in 25 l of methanol. After drying to constant weight under 100 mm of mercury at 50°C, a copolymer containing 72 mol percent of acrylamide and 28 mol percent of allyl alcohol and having a specific viscosity (water — 5 g/l — 25°C) of 1.70, is obtained.

The organopolysiloxane of the composition (C) consists of a mixture (80/20 by weight) of an $\alpha, \omega$-dihydroxylic dimethylpolysiloxane oil having a viscosity of 10,000 cPo at 25°C and a polysiloxane resin obtained by cohydrolysis of methyltrichlorosilane (76.2 percent by weight) and dimethyldichlorosilane (23.8 percent).

The treated paper is subjected to the following tests:
A. measurement of the non-stick character,
B. retention of adhesiveness and
C. ability to transfer plastisols.

A. Non-stick Character

This non-stick character is expressed by the force (in g/cm) necessary to detach a strip of adhesive plasticised fabric applied to the treated face of the paper and kept in contact with this face for 48 hours at 25°C under a pressure of 24 g/cm². The adhesive strip is pulled off by means of a tensometer, at a speed of 25 cm/minute.

In the case of the paper treated according to the present Example, the force is 14 g/cm.

By way of comparison, this force is 70 g/cm in the case of a paper treated by means of a composition identical to the composition C but not containing any allyl alcohol/acrylamide copolymer.

B. Retention of Adhesiveness

A strip of adhesive fabric of width 5 cm is applied to a sheet of aluminium by means of a roller weighing 2 kg and is left in contact for 30 minutes at 25°. The force (Fa) ) necessary to detach this strip, pulled off at a speed of 25 cm/minute, is measured.

The same measurement is then made on a strip of adhesive fabric which has been placed in contact with the treated face of the paper and which has been separated therefrom as indicated under A (force Fb).

The ratio (Fb/Fa), which expresses the retention of adhesiveness, is, in the present case, equal to 90 percent.

C. Transfer of Plastisols

A composition is prepared from: 59 g of polyvinyl chloride homopolymer (Afnor (French Standard) viscosity index 200/205), 41 g of dioctyl phthalate, 1.2 g of a stabiliser containing derivatives of barium and calcium, sold commercially under the trade name MARK KCB and 1g of carbon black.

This composition is applied with a knife to the paper treated as indicated above (width of the layer of plastisol: 75 mm). The amount of product deposited is 40 g/m². After gelling the plastisol (heating at 180°C for a period of 2 minutes) the paper is attached to a vertical support.

Detachment of the upper part of the PVC film is begun and then a 70 g weight is hung onto the detached end and the time necessary for the PVC film to become detached over a length of 100 mm is measured. The result is 6 seconds.

I claim:

1. An aqueous dispersion, consisting essentially of, per 100 parts of water, 1 to 5 parts by weight or a water soluble film forming copolymer of 5 to 40 mol percent allyl alcohol and 60 to 95 mol percent acrylamide and 2 to 10 parts by weight of an organopolysiloxane which is a mixture consisting essentially of a. 60 to 98 percent by weight of an organopolysiloxane of the formula:

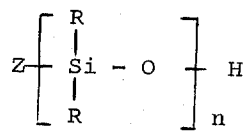

in which the symbols R independently represent an alkyl radical with 1 to 4 carbon atoms or a phenyl radical, the symbol Z represents a hydroxyl group or an —R group and $n$ is an integer of 10 – 100,000, b. 2 to 40 percent by weight of a organopolysiloxane selected from the group consisting of:

i. an organohydrogenopolysiloxane of the formula (a) $(R)_s H_t SiO_{(4-s-t)/2}$  1 – 0.75 – value of 5 + in which R is as defined in (A) above, the average value of s is 1– 1.5, the average value of t is 0,75– 1.25 and the average valueof the sum $s't$ is 2–2.25, ii. an organopolysiloxane resin consisting essentially of repeating units of the formula $(R)_2SiO$ and $RSiO_{3/2}$ in which R is as defined in (a) above, the respective proportions of the said units being such that the number of —R groups bonded to a silicon atom is 1.05 – 1.4, and iii. a polyalkyl silicate, and c. a curing agent for the siloxane or silicate present in an amount of 0.05 to 10 percent of the weight of polysiloxane (a).

2. A dispersion according to claim 1 wherein the copolymer is derived fron 10–30 mole percent allyl alcohol and 70–90 mole percent acrylamide.

3. A dispersion according to claim 1 of viscosity 20–40 cPo at 25°C.

4. A dispersion according to claim 1 wherein the copolymer is of about 72 mole percent acrylamide and about 28 mole percent allyl alcohol, the organopolysiloxane is a mixture of about 80 parts by weight α, ω-dihydroxy dimethylpolysiloxane of viscosity about 10,000 cPo at 25°C and a polysiloxane resin obtained by cohydrolysis of a mixture of about 76 percent by weight methyltrichlorosilane and about 24 percent by weight dimethyldichlorosilane and the curing agent is dibutyltin dilaurate.

* * * * *

UNITED STATES PATENT OFFICE
CERTIFICATE OF CORRECTION

Patent No. 3,865,773　　　　　　　　　　Dated　February 11, 1975

Inventor(s)　Jean DUMOULIN

It is certified that error appears in the above-identified patent and that said Letters Patent are hereby corrected as shown below:

In the heading, after the inventor's name, the place of residence should read --Villeurbanne--, rather than "Villerubane".
In the heading, the date of the priority application should read --July 7, 1972-- rather than "July 5, 1972".

Signed and sealed this 20th day of May 1975.

(SEAL)
Attest:

RUTH C. MASON
Attesting Officer

C. MARSHALL DANN
Commissioner of Patents
and Trademarks